United States Patent Office 3,510,198
Patented May 5, 1970

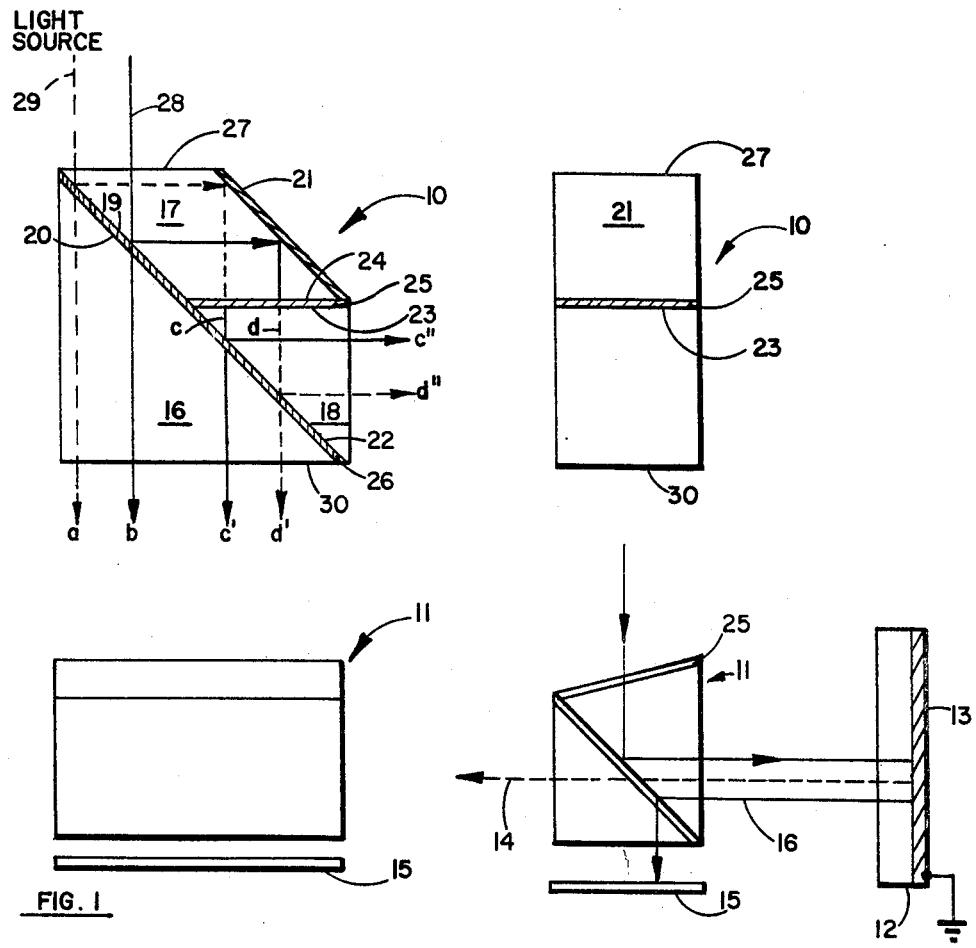
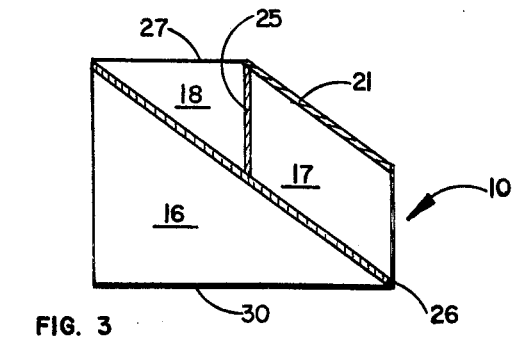
FIG. 3
INVENTOR.
JACKIE D. PACE
BY Roy M. Pitts
ATTORNEY

3,510,198
POLARIZING BEAM-SPLITTER HAVING IMPROVED CONTRAST RATIO
Jackie D. Pace, Fullerton, Calif., assignor to North American Rockwell Corporation, a corporation of Delaware
Filed May 17, 1967, Ser. No. 639,243
Int. Cl. G02b 27/28, 5/30
U.S. Cl. 350—157           8 Claims

ABSTRACT OF THE DISCLOSURE

A polarizing beam splitter for providing a preselectively linearly polarized light source. The polarization plane of the cross-polarization component of a source of illumination, ordinarily rejected by a polarizing beam splitter, is rotated substantially 90° and the rotated cross-polarized component is then re-processed by the beam-splitter and combined with the preselectively linearly polarization component of incident light transmitted by the polarizing beam splitter, resulting in minimum light loss and maximum contrast ratio.

CROSS-REFERENCES TO RELATED APPLICATIONS

U.S. application Ser. No. 453,125 filed May 4, 1965, now Pat. No. 3,396,305, by Charles L. Buddecke et al., for Image Projection Device.

BACKGROUND OF THE INVENTION

In certain image projection systems, an optical image is projected by cooperation of a polarized light source with a polarization-sensitive light modulation means, in response to electrical modulation signals corresponding to an image to be transmitted. In such general arrangements, an electrical charge pattern is impressed across the parallel faces of a birefringent optical material, thereby inducing a corresponding pattern of elliptical polarization. Hence, a source of polarized light, polarized in a plane mutually orthogonal with that of the linear polarization of the electro-optic material, may now be projected by means of the cooperation of the illuminated crystal with a cross-polarization analyzer to provide a projected image, as described more fully in U.S. application Ser. No. 453,125 filed May 4, 1965, now Pat. No. 3,396,305, by Charles L. Buddecke et al., assignors to North American Aviation, Inc., assignee of the subject invention.

The quality of the image projected by such means is limited, among other things, by the "purity" of the polarized light source used to illuminate the light-modulating electro-optic crystal. In other words, the ratio of that energy content cross-polarized relative to energy having the primary, or intended, plane of polarization, determines the minimum projected light level, in response to no modulation of the electro-optic material (i.e., that unexcited condition of the electro-optic crystal in which it transmissively responds to substantially only the cross polarization component of the polarized light). This ratio of undesired light energy content (in absence of a modulation signal) to the available light energy of desired polarization (projected in response to an optimum modulation) is a measure of the degree of image contrast obtainable, and for that reason is referred to hereinafter as the contrast ratio.

Another aspect of the polarized light source, utilized in the above-described arrangement, is the amount of heat and light energy dissipated by the light source. The low efficiencies represented by such dissipation result from the fact that in a conventional polarizing beam splitter approximately one-half the light energy is discarded by the polarizer, in rejecting a cross-polarization light energy component, while transmitting a preselected linear polarization component.

A device for avoiding the loss of the cross-polarization component of the light energy source is shown in U.S. Pat. No. 2,476,014, issued July 12, 1949, to E. H. Wright. Such patent teaches employing a reflective prism face to redirect the rejected cross-polarization light component toward the transmitted component, and teaches the application of a half wave retarder over a portion of the emergent face of the prism for rotating the polarization plane of the rejected component as to be substantially parallel with that of the transmitted component. While all of the light emerging from the device is of substantially the same polarity, yet the contrast ratio provided by such device is limited. In other words, an appreciable cross-polarization component is present in the emergent light energy. Further, to so locate the half wave retardation layer as suggested by Wright would necessitate the addition of a third layer of glass to protect or sandwich such layer.

SUMMARY OF THE INVENTION

By means of the concept of the subject invention the cross polarization component, rejected by a polarizing beam splitter, is recovered with a reduced incident cross-polarization content resulting in improved contrast ratios.

In a preferred embodiment of the invention, there is provided a polarizing beam-splitter having a polarization sensitive light-energy transmitting and reflective layer. There is also provided half-wave retardation means for substantially 90° rotation of the polarization plane of that polarized light energy component reflected by the polarization sensitive layer, and optically reflective means in cooperation with the half-wave retardation means for redirecting the half-wave retarded light component back through the polarization layer and contiguous with an incident light energy component transmitted by the polarization-sensitive layer.

By means of the above-described arrangement, the optical path of the cross-polarization component (of an incident light beam) encounters the polarization sensitive layer twice, once for "sorting" (prior to polarization rotation and again for rejection or "filtering" of any remaining cross-polarization remaining after polarization rotation. In this way, a highly efficient structure is provided for reducing light loss and achieving high contrast ratios. Accordingly, it is an object of the invention to provide an improved polarizing beam splitter.

It is another object of the invention to provide a polarization beam splitter for producing light beam polarized in mutually parallel planes from a single light beam.

It is yet another object of the invention to provide a polarized beam splitter for combining beams polarized in planes mutually at right angles into a single light beam having a single common plane of polarization.

It is a further object to provide a light polarizer of both improved efficiency and improved contrast ratio.

These and other objects of the invention will become apparent from the following description, taken together with the accompanying drawings, in which:

BRIEF DESCRIPTION OF THE DRAWINGS

FIG. 1 is an arrangement of an optical system in which the inventive concept may be advantageously employed, illustrating a preferred embodiment of the invention;

FIG. 2 is an orthographic projection of the arrangement of FIG. 1; and

FIG. 3 is an alternate embodiment of the arrangement of FIG. 1.

In the figures, like elements refer to like parts.

DESCRIPTION OF THE PREFERRED EMBODIMENTS

Referring now to FIGS. 1 and 2, there is illustrated an optical system in which the inventive concept may be advantageously employed, FIG. 2 being an orthographic projection of FIG. 1. There is provided a polarizing beam splitter 10 for processing a beam of light from a light source to provide a linearly polarized light beam, and a beam splitter 11 such as a Foster prism or modified Glans-Thompson prism for transmitting the preselectively polarized light beam from polarization source 10 through a window of an electron beam tube (not shown) through a composite electro-optic material 12 to a reflective back surface 13 thereof, and transmitting a cross-polarized component (shown as dotted line 14) of the reflected light therefrom to a projection screen (not shown). A light stop 15 may be used in connection with beam-splitter 11 to stop the transmission of the selected (original) polarization components reflected from element 13 (and shown as solid line 16).

Polarizing beam splitter 10 is comprised of a major right-angled triangular optical prism 16, rhomboidal optical prism 17, and a minor right-angled triangular optical prism 18. A first face 19 of rhomboidal prism 17 is adjacent a portion of the hypotenuse face 20 of major prism 16, and an opposite face 21 of rhomboidal prism 17 being reflectively coated. A hypotenuse face 22 of minor triangular prism 18 is coplanar with face 19 of rhomboidal prism 17 and adjacent the remaining portion of the hypotenuse face 20 of major prism 16, one face 23 of two mutually right angled surfaces of minor prsm 18 being adjacent a side 24 of rhomboidal prism 17 which is mutually contiguous with faces 19 and 21 thereof. The optical material employed for prisms 16, 17 and 18 is preferably a single common type of high quality optical material, such as BSC–2 type optical glass, although other types of optical materials may be employed.

A correctly-oriented one-half wave retardation plate 25 is interposed between adjacent faces 23 and 24 of minor prism 18 and rhomboidal prism 17, the attachment of such plate being known in the art, as indicated in the above noted U.S. Pat. 2,476,014 to Wright.

A polarization sensitive transmitting and reflecting layer 26 is interposed between the hypotenuse surface 20 of major prism 16 and the adjacent corresponding coplanar faces 19 and 22 of prisms 17 and 18. The application of such layers and the means of cementing the coated prisms together are known in the art, being described, for example, in the above noted U.S. Pat. 2,476,014 to Wright and in U.S. Pat. 2,815,695 issued Dec. 10, 1957, to P. T. Scharf for Neutral Beam Splitter.

In normal application of the polarizing beam splitter of FIGS. 1 and 2, surface 27 of rhomboidal prism 17 serves as an incident face to an incident light beam which may have mutually crossed-polarized components, a selected polarization corresponding to that substantially transmitted by polarization sensitive layer 26 being shown as solid line 28 and a cross-polarized component being shown as dotted line 29. Face 30 of the two mutually right-angled faces of major prism 16 serves as an emergent face of element 10. Incident component 28 is substantially transmitted through layer 26 as beam $b$, while cross-polarization component 29 is substantially reflected by layer 26, and redirected by reflective surface 21 through half-wave retardation plate 25 (which substantially rotates the polarization 90°) to polarization layer 26. The substantial repolarization or polarization rotation of the cross polarization component by half wave plate 25, indicated by solid line $c$, permits substantially all of such component to be transmitted through polarization sensitive layer 26 (as solid line $c'$) and combined with component $b$. In other words, almost all of the incident light beam (lines 28 and 29) is recovered as a linearly polarized light beam comprised of commonly polarized and mutually contiguous component beams.

The improvement contrast ratio obtained by the device of the invention may be appreciated from a consideration of the relative amounts of energy represented by component beams $a$ and $d'$, relative to the sum of $b$ and $c'$. The optical coatings employed in the art for polarizing layer 26 reflect as much as 99.5% of the cross-polarization component 29, while reflecting no more than 3% of the parallel polarization component 28. In other words, 0.5% of the cross-polarization component 29 is transmitted through layer 26 as component beam $a$ and 97% of the parallel polarization component 28 is transmitted as component beam $b$. The reflected (and subsequently half-wave retarded) components $c$ and $d$, if combined directly with components $a$ and $b$ as taught by the above-noted patent to Wright, would provide a limited contrast ratio, which may be quantitatively determined as follows. Assuming that the incident light energy at face 27 is divided evenly into the selected or parallel polarization component 28 and the crossed polarization component 29, then the parallel polarization energy provided by component $b$ and $c$ is:

$$b = \frac{97\%}{2} = 48.5\%$$

$$c = \frac{99.5\%}{2} = 49.75\%$$

$$b + c = 98.25\%$$

The corresponding cross-polarization energy provided by components $a$ and $d$ is:

$$a = \frac{0.5\%}{2} = 0.25\%$$

$$d = \frac{3\%}{2} = 1.5\%$$

$$a + d = 1.75\%$$

The associated contrast ratio for Wright's device is:

$$\frac{b+c}{a+d} = \frac{98.25}{1.75} = 56:1$$

In the device of the invention, the components $c$ and $d$ are processed by layer 26, whereby 3% of $c$ is reflected as component $c''$ and 99.5% of $d$ is reflected as component $d''$. In other words, 97% of parallel polarization component $c$ is recovered as component $c'$ and 0.5% of cross polarization component $d$ is transmitted as component $d'$. Thus, the parallel polarization energy provided by components $b$ and $c'$ is:

$$b = \frac{97\%}{2} = 48.5\%$$

$$c' = \frac{99.5\%}{2} \times .97 = 48.26\%$$

$$b + c' = 96.76\%$$

The corresponding cross-polarization energy provided by components $a$ and $d'$ is:

$$a = \frac{0.5\%}{2} = 0.25\%$$

$$d' = \frac{3\%}{2} \times .005 = 0.0075\%$$

$$a + d' = 0.2575$$

The associated contrast ratio for the polarizer 10 of FIGS. 1 and 2 is:

$$\frac{b+c'}{a+d'} = \frac{96.76}{0.2575} = 379:1$$

Such ratio of 379:1 is seen to be substantially greater than that obtainable from the prior-art polarizing beam splitter of Wright, while the efficiency of the inventive polarizer ($a+b+c'+d=97.0175\%$) is very high. In other words, a greater range of "shades of grey" may be provided by the system of FIG. 2 in response to electro-static modulation of crystal 12, resulting in higher quality optical images.

Accordingly, it is to be understood that an improved polarizing beam splitter has been described, for providing increased light contrast ratios while maintaining high light efficiency.

An alternate arrangement in which the halfwave retardation plate 25 and reflective surface 21 cooperate to re-polarize and redirect the rejected polarization component through polarizing layer 26 is shown in FIG. 3. In such arrangement the retardation plate is located between polarizer 26 and mirror 21 and is oriented normal to the incident optical path to mirror 21 (rather than normal to the reflective optical path, as shown in FIG. 1).

Although the invention has been illustrated and described in detail, it is to be clearly understood that the same is by way of illustration and example only.

I claim:

1. In a polarizing beam-splitter having a polarization-sensitive light-energy transmitting and reflective layer, contrast ratio improving means comprising
    half-wave retardation means for substantially 90° rotation of the polarization plane of that polarized light energy component reflected by said polarization sensitive layer; and
    optically reflective means in cooperation with said half-wave retardation means for redirecting said polarized light component through said polarization sensitive layer, whereby a high-efficiency linearly polarized emergent beam of improved contrast is provided.

2. The device of claim 1 in which optically reflective means is oriented for redirecting said polarized light component in a manner contiguous with an incident light energy component transmitted by said polarization sensitive layer.

3. The device of claim 1 in which said optically reflective means is oriented for redirecting said reflected polarized light energy component to an emergent face of said beam-splitter and contiguous with an incident light energy component transmitted by said polarization-sensitive layer, said half-wave retardation means being interposed in the incident and reflected optical path of said optically reflective means.

4. The device of claim 3 in which said half wave retardation means is interposed between said reflective means and said polarization layer in the emergent reflective optical path of said reflective means.

5. The device of claim 1 in which said half-wave retardation means is interposed in the reflective path of said reflective means between said reflective means and said polarization sensitive layer.

6. In a polarizing beam splitter having a polarization sensitive light-energy transmitting and reflective layer for transmitting a preselected linear polarization component and reflecting a cross-polarization component, contrast ratio improving means comprising
    half wave retardation means for substantially 90° rotation of the polarization plane of said cross polarization component; and
    polarization analyzer means responsive to said rotated cross-polarization plane for directing said polarization rotated cross-polarized component substantially contiguous with an incident preselected linear polarization component transmitted by sid polarization sensitive layer, whereby a high-efficiency linearly polarized emergent beam of improved contrast is provided.

7. A polarizing beam splitter for producing a common polarization of substantially all of the component energy of an incident light beam for polarized illumination of a single object plane, and comprising
    a major right-angled triangular optical prism and having a hypotenuse face;
    a rhomboidal optical prism having a mutually contiguous first and second face and reflectively coated third face opposite said first face, said first face being adjacent a portion of said hypotenuse face of said major prism;
    a minor right-angled triangular optical prism having a hypotenuse face adjacent to a remaining portion of said hypotenuse face of said major prism and further having one of two mutually right-angled faces adjacent said second face of said rhomboidal prism;
    a polarization-sensitive transmitting and reflecting layer interposed between said hypotenuse face of said major prism and said first face of said rhomboidal prism and said hypotenuse face of said minor prism; and
    a half-wave retardation layer interposed between said second face of said rhomboidal prism and said one of two mutually right-angled faces of said minor prism.

8. A polarizing beam splitter for producing a common polarization of substantially all of the component energy of a light beam for polarized illumination of a single object plane, and comprising
    a substantially rhomboidal optical prism having a mutually contiguous first and second face and a reflective coated third face opposite said first face;
    a minor right angled triangular optical prism having a hypotenuse face coplanar with said first face of said rhomboidal prism and further having one of two mutually right-angled faces adjacent said second face of said rhomboidal prism;
    a major right-angled triangular optical prism, having a hypotenuse face adjacent said coplanar faces of said rhomboidal and minor prisms;
    a polarization-sensitive light-energy transmitting and reflecting layer interposed between said coplanar faces and said hypotenuse face of said major prism; and
    a half-wave retardation layer interposed between the mutually adjacent surfaces of said rhomboidal and minor prisms.

References Cited

UNITED STATES PATENTS

| | | | |
|---|---|---|---|
| 2,449,287 | 9/1948 | Flood | 350—152 |
| 3,060,808 | 10/1962 | Koester | 350—157 |
| 3,401,593 | 9/1968 | Altman | 350—152 X |

DAVID SCHONBERG, Primary Examiner

P. R. MILLER, Assistant Examiner

U.S. Cl. X.R.

350—152, 169, 174